United States Patent [19]

Konrad et al.

[11] Patent Number: 4,814,308

[45] Date of Patent: Mar. 21, 1989

[54] PREPARATION OF HOMOPOLYMERS AND COPOLYMERS OF ETHENE BY PHILLIPS CATALYSIS

[75] Inventors: Rainer Konrad, Goennheim; Guido Funk, Worms; Juergen Schmidt-Thuemmes, Ludwigshafen; Rudolf Mueller-Mall, Neuhofen; Guenther Schweier, Friedelsheim, all of Fed. Rep. of Germany

[73] Assignee: BASF Aktiengesellschaft, Ludwigshafen, Fed. Rep. of Germany

[21] Appl. No.: 110,872

[22] Filed: Oct. 21, 1987

[30] Foreign Application Priority Data

Oct. 21, 1986 [DE] Fed. Rep. of Germany ....... 3635710

[51] Int. Cl.$^4$ .............................................. C08F 4/62
[52] U.S. Cl. ................... 502/107; 502/114; 502/117; 502/162; 502/210; 526/105
[58] Field of Search ............... 502/107, 117, 114, 162, 502/210

[56] References Cited

U.S. PATENT DOCUMENTS

| | | | |
|---|---|---|---|
| 4,100,104 | 7/1978 | Katzen et al. | 502/117 X |
| 4,192,775 | 3/1980 | Rekers et al. | 502/117 |
| 4,234,453 | 11/1980 | Rekers et al. | 502/117 |
| 4,238,353 | 12/1980 | Speca | 502/162 X |
| 4,290,914 | 9/1981 | Katzen et al. | 502/107 |
| 4,297,461 | 10/1981 | Speca | 526/100 |
| 4,312,786 | 1/1982 | Katzen et al. | 502/117 X |

FOREIGN PATENT DOCUMENTS 0090374  3/1983  European Pat. Off. .
1537892  1/1979  United Kingdom .
2090158  7/1982  United Kingdom .

*Primary Examiner*—Patrick P. Garvin
*Attorney, Agent, or Firm*—Keil & Weinkauf

[57] ABSTRACT

Ethene polymerization by Phillips catalysis is carried out using (1) a supported catalyst, which is laden with chromium, phosphorus and aluminum, and (2) a cocatalyst, (1) being obtained by a method in which (1.1) a catalyst intermediate laden with chromium, phosphorus and aluminum is prepared from a silicate carrier, a selected chromium compound, a selected phosphorus compound and a selected aluminum compound, and then (1.2) the catalyst intermediate is heated in an oxygen-containing gas stream. In this process, the component (1) used is one which is obtained by a method in which, in each case in a specific manner, (1.1) in a first stage, (1.1.1) first a suspension is prepared from (1.1.1.1) a finely divided silicate carrier and (1.1.1.2) an inert organic solvent, (1.1.2) then, (1.1.2.1) in an inert organic solvent, (1.1.2.2) an organic chromium compound is combined with (1.1.2.3) an aluminum trialkyl, (1.1.3) then (1.1.3.1) the suspension resulting from (1.1.1) is combined with (1.1.3.2) a phosphoric acid or phosphite and (1.1.3.3) the product obtained from (1.1.2), (1.1.4) finally, the suspension obtained in (1.1.3) is evaporated to dryness, and then (1.2) in a second stage, first (1.2.1) the intermediate obtained from (1.1) is treated with a stream of nitrogen, then (1.2.2) the intermediate obtained from (1.2.1) is heated in an oxygen-containing gas stream, and finally (1.2.3) the intermediate obtained from (1.2.2) is treated with a stream of nitrogen, and both a lithiumalkyl and a boronalkyl are used as (2).

1 Claim, No Drawings

PREPARATION OF HOMOPOLYMERS AND COPOLYMERS OF ETHENE BY PHILLIPS CATALYSIS

The present invention relates to a process for the preparation of ethene homopolymers and ethene copolymers with minor amounts of copolymerized $C_3$–$C_{12}$-alphamonoalkenes, in particular $C_3$–$C_8$-alpha-monoalkenes, by polymerization of the monomer or monomers at from 30° to 150° C., in particular from 60° to 120° C., and under from 2 to 150, in particular from 5 to 60, bar by Phillips catalysis using (1) a supported catalyst consisting of a carrier which is laden with chromium in oxide form, phosphorus in oxide form and aluminum in oxide form, and (2) a cocatalyst, the supported catalyst (1) being obtained by a method in which (1.1) in a first stage, a catalyst intermediate (1.1) laden with the desired amounts of chromium, phosphorus and aluminum is prepared from (1.1.a) a finely divided, porous silicate carrier,
(1.1.b) a selected, specific chromium compound,
(1.1.c) a selected, specific phosphorus compound and
(1.1.d) a selected, specific aluminum compound, and then (1.2) in a second stage, the catalyst intermediate (1.1) obtained from the first stage is kept (i.e. calcined or activated) in an anhydrous gas stream containing oxygen in a concentration of more than 10% by volume for from 10 to 1000, in particular from 60 to 300, minutes at from 300° to 900° C., in particular from 400° to 600° C., and thus converted to the actual supported catalyst (1).

Polymerization processes of this type are known, examples of typical processes in the present context being those described in British Patent No. 2,090,158 and European Laid-Open Application No. 90,374.

A typical feature of these processes is that supported catalysts are used, in the preparation of which, in the first stage, i.e. for obtaining the catalyst intermediate, a silicate carrier is laden with aluminum phosphate from a solution containing the appropriate ions, but the chromium component is introduced independently, and a boronalkyl is used as the cocatalyst.

Also noteworthy in this connection is, for example, a polymerization process of a related but different type, which is described in British Patent No. 1,537,892.

An essential feature of this process is that supported catalysts are used in which the catalyst intermediate is obtained by loading a carrier with a selected aluminum compound and the reaction product of a selected phosphorus compound with chromium trioxide, and a boronalkyl serves as the cocatalyst.

Finally, also of interest in the present context are polymerization processes which are likewise of a related but different type, typical examples of these processes being described in U.S. Pat. Nos. 4,290,914 and 4,297,461.

A significant feature of these processes is that supported catalysts are used in the preparation of which the carrier is first laden with a selected aluminum compound and the resulting intermediate is subjected to a heat treatment, i.e. calcination, after which the resulting intermediate is laden with the reaction product of a selected phosphorus compound with chromium trioxide, and the product obtained in this procedure is in turn calcined, and a boronalkyl is preferably used as the cocatalyst.

The polymerization processes discussed above are based on a particular embodiment of Phillips catalysis, i.e. one which employs a supported catalyst which contains not only chromium in oxide form but also phosphorus in oxide form and aluminum in oxide form, the content of the last-mentioned compound, particularly in combination with an alkyl compound as a cocatalyst, giving polymers which have variable molecular weight distributions and a high melt flow index, i.e. polymers which are very versatile and therefore particularly suitable for certain applications, e.g. blow molding.

Although the known polymerization processes of the type under discussion give polymers having variable molecular weight distributions and a higher melt flow index, this is frequently not as high as desired, and the productivity achieved is unsatisfactory, i.e. the yield of polymer per unit weight of supported catalyst used is inadequate.

It is an object of the present invention further to develop a process of the type defined at the outset, so that the disadvantages described above are encountered to a substantially reduced extent if at all.

We have found that this object is achieved if, in the polymerization process under discussion (1) the supported catalyst used is obtained by a method in which, in each case in a specific manner, (1.1) in a first stage, (1.1.1) a suspension is first prepared from (1.1.1.1) a finely divided silicate carrier and (1.1.1.2) an inert organic solvent, (1.1.2) then, (1.1.2.1) in an inert organic solvent, (1.1.2.2) a chromium compound of the formula $Cr^{3+}(RCO\text{-}CR^1\text{-}COR)^{3-}$, where R is alkyl and $R^1$ is alkyl or hydrogen, is combined with (1.1.2.3) an aluminum compound of the formula $AlR^2_3$, where $R^2$ is alkyl, (1.1.3) then (1.1.3.1) the suspension resulting from (1.1.1) is combined with (1.1.3.2) a phosphorus compound of the formula $P(O)(OR^3)_3$ or $P(O)H(OR^3)_2$, where $R^3$ is alkyl, aryl or cycloalkyl or hydrogen, with the proviso that one or more radicals R are not hydrogen, and (1.1.3.3) the product obtained from (1.1.2), and (1.1.4) finally, the suspension obtained in (1.1.3) is evaporated to dryness, and then (1.2) in the second stage, first (1.2.1) the catalyst intermediate obtained from the first stage (1.1) is treated with a stream of nitrogen, then (1.2.2) the intermediate obtained from (1.2.1) is heated in an oxygen-containing gas stream, and finally (1.2.3) the intermediate obtained from (1.2.2) is treated with a stream of nitrogen and (2) both a lithiumalkyl and a boronalkyl are used as a cocatalyst.

The present invention accordingly relates to a process for the preparation of ethene homopolymers and ethene copolymers with minor amounts of copolymerized $C_3$–$C_{12}$-alphamonoalkenes, in particular $C_3$–$C_8$-alpha-monoalkenes, by polymerization of the monomer or monomers at from 30° to 150° C., in particular from 60° to 120° C., under from 2° to 150° C. in particular from 5 to 60, bar, by Phillips catalysis using (1) a supported catalyst consisting of a carrier which is laden with chromium in oxide form, phosphorus in oxide form and aluminum in oxide form, and (2) a cocatalyst, the supported catalyst (1) being obtained by a method in which (1.1) in a first stage, a catalyst intermediate (1.1) laden with the desired amounts of chromium, phosphorus and aluminum is prepared from (1.1.a) a finely divided, porous silicate carrier,
(1.1.b) a selected, specific chromium compound,
(1.1.c) a selected, specific phosphorus compound and (1.1.d) a selected, specific aluminum compound, and then (1.2) in a second stage, the catalyst intermediate (1.1) obtained from the first stage is kept (i.e. calcined or activated) in an anhydrous gas stream containing oxygen in a concentration of more than 10% by volume for from 10 to 1000, in particular from 60 to 300, minutes at from 300° to 900° C., in particular from 400° to 600° C., and thus converted to the actual supported catalyst (1).

In the novel process, (1) the supported catalyst used is obtained by a method in which (1.1) in a first stage, a catalyst intermediate is prepared by a method in which first, (1.1.1) in a first substage, a suspension is prepared from (1.1.1.1) a finely divided, porous silicate carrier which has a particle diameter of from 1 to 400 μm, preferably from 10 to 200 μm, a pore volume of from 0.5 to 3, preferably from 1 to 2.5, cm³/g and a surface area of from 100 to 1000, preferably from 200 to 700, m²/g, and (1.1.1.2) an inert organic solvent, preferably a liquid aliphatic, cycloaliphatic or aromatic hydrocarbon, in particular a $C_5$–$C_7$-alkane, with thorough mixing, and with the proviso that from 150 to 5000, preferably from 200 to 1000, parts by weight of the solvent (1.1.1.2) are employed per 100 parts by weight of the carrier (1.1.1.1), then (1.1.2) in a second substage, (1.1.2.1) in a solvent of the type defined under (1.1.1.2)

(1.1.2.2) a chromium compound of the formula

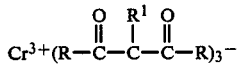

where R is alkyl of not more than 12, preferably not more than 4, carbon atoms, in particular methyl, and $R^1$ is alkyl of not more than 12, preferably not more than 4, carbon atoms or, in particular, hydrogen, is combined with (1.1.2.3) an aluminum compound of the formula $AlR_3^2$, where $R^2$ is alkyl of not more than 12, preferably from 2 to 4, carbon atoms, in particular isobutyl, with thorough mixing, at from 0° to 100° C., preferably from 20° to 50° C., with the proviso that there are from 0.5 to 10, preferably from 1 to 3, parts by weight of aluminum from the aluminum compound (1.1.2.3) and from 5 to 500, preferably from 50 to 300, parts by weight of solvent (1.1.2.1) per part by weight of chromium from the chromium compound (1.1.2.2), and the entire mixture is kept at the stated temperature for from 5 to 300, preferably from 20 to 60, minutes, then (1.1.3) in a third substage, (1.1.3.1) the suspension resulting from substage (1.1.1) is combined with (1.1.3.2) a phosphorus compound of the formula $P(O)(OR^3)_3$ or $P(O)H(OR^3)_2$, where $R^3$ is alkyl, aryl or cycloalkyl of not more than 12, preferably not more than 6, carbon atoms, or hydrogen, in particular $C_2$–$C_4$-alkyl or hydrogen, with the proviso that one or more radicals R are not hydrogen, and (1.1.3.3) the product obtained from substage (1.1.2), with thorough mixing at from 0° to 60° C., preferably from 10° to 30° C., with the proviso that from 0.1 to 5, preferably from 0.5 to 2, parts by weight of chromium from the chromium compound (1.1.2.2) and from 0.5 to 10, preferably from 1 to 3, parts by weight of phosphorus from the phosphorus compound (1.1.3.2) are employed per 100 parts by weight of the carrier (1.1.1.1), and the entire mixture is kept at the stated temperature for from 5 to 300, preferably from 20 to 60 minutes, and finally (1.1.4) in a fourth substage, the suspension obtained in substage (1.1.3) is evaporated to dryness at no higher than 150° C., preferably no higher than 80° C., under atmospheric or reduced pressure, and then (1.2) in a second stage, the catalyst intermediate obtained from the first stage (1.1) is converted to the actual supported catalyst by a method in which first, (1.2.1) in a first substage, the catalyst intermediate obtained from the first stage (1.1) is kept in a stream of anhydrous nitrogen, at from 150° to 300° C., in particular from 200° to 270° C., for from 60 to in particular for from 100 to 300, 500, minutes, then (1.2.2) in a second substage, the intermediate obtained from substage (1.2.1) is kept in an anhydrous gas stream containing oxygen in a concentration of more than 10% by volume for from 10 to 1000, in particular from 60 to 300, minutes at from 300° to 900° C., in particular from 500° to 800° C., and finally (1.2.3) in a third substage, the intermediate obtained from substage (1.2.2) is kept in a stream of anhydrous nitrogen for from 10 to 300, in particular from 30 to 150, minutes at from 50° to 400° C., in particular from 100 to 270° C., and (2) both a lithiumalkyl of the formula $LiR^4$ and a boronalkyl of the formula $BR^5$ where $R^4$ and $R^5$ are each $C_1$–$C_{12}$-alkyl, in particular $C^2$–$C^4$-alkyl, are used as the cocatalyst, the molar ratio of lithiumalkyl to boronalkyl being from 1:0.1 to 1:10, preferably from 1:0.2 to 1:5, with the proviso that the atomic ratio of chromium in the supported catalyst (1) to lithium plus boron in the cocatalyst (2) is greater than 1:100, in particular from 1:1 to 1:20.

Regarding the general aspects of the novel polymerization process, the following may be stated:

Provided that the feature according to the invention is taken into account, the polymerization process as such can be carried out in virtually any relevant conventional technological embodiment, for example as a batchwise, cyclic or continuous suspension polymerization or dry-phase polymerization process in a stirred or fluidized bed. The stated technological embodiments, i.e. the technological variants of the polymerization of olefins by the Phillips method, are well known from the literature and in practice, so that no further description is required.

It should be noted that the novel procedure is preferably carried out as a process for the continuous preparation of particulate homopolymers or copolymers by polymerization of the monomer or monomers in, as a reaction medium, a liquid $C_4$- or $C_5$-alkane, in which the monomer or monomer mixture to be polymerized is present in dissolved form and the resulting particulate polymer is present in suspended form, in the presence or absence of an antistatic as an antifouling agent and in the presence or absence of hydrogen as a molecular weight regulator, the reaction mixture being circulated and starting materials being added to the circulation and the resulting particulate polymer being removed from it. Polymerization processes of this type, i.e. processes for the preparation of homopolymers and copolymers of ethylene by suspension polymerization of the monomer or monomers in a liquid alkane are known in many embodiments; in the present context, reference may be made, by way of example, to the procedures described in British Patent Nos. 841,263 and 1,435,965 and U.S. Pat. Nos. 3,242,150 and 4,007,321.

It should also be noted that the novel supported catalyst (1), like corresponding known catalysts, can, for example, be combined with the cocatalyst (2) outside or inside the polymerization space, in the last-mentioned case, for example, by introducing the components at separate points; the components may be handled in the form of a suspension (catalyst) or solution (cocatalyst).

Finally, it should also be stated that the novel polymerization process is mainly suitable for the preparation of those ethene homopolymers and ethene copolymers (the latter in particular with propene, but-1-ene, hex-1-ene, 4-methylpent-1-ene or oct-1-ene) which are intended to have a high melt flow index and a molecular weight distribution varied in a controlled manner (i.e. polymers as preferably used, for example, for blow molding), in particular good productivity, i.e. a high yield of polymer per unit weight of supported catalyst used, being achieved.

Regarding the novel supported catalyst (1) itself, which is to be used according to the invention, the following may be stated:

It is prepared in two stages, which are designated (1.1) and (1.2) above and below.

In the first stage (1.1), the catalyst intermediate is prepared by means of four substages (1.1.1), (1.1.2), (1.1.3) and (1.1.4), which can be carried out readily and without difficulties by the skilled worker. The latter advantageously uses an apparatus which permits continuous, very homogeneous mixing of the particular mixtures under a protective inert gas atmosphere such as a nitrogen atmosphere. It is also advantageous, in substages (1.1.2) and (1.1.3) if, in the solvent (1.1.2.1), the chromium compound (1.1.2.2) is reacted with the aluminum compound (1.1.2.3), and the suspension (1.1.3.1) is reacted with the phosphorus compound (1.1.3.2) and the product (1.1.3.3), not abruptly but gradually, for example by initially taking one component and slowly introducing the other component. Finally, the evaporation process in substage (1.1.4) is carried out under mild conditions, for which purpose, for example, a rotary evaporator is suitable.

In the second stage (1.2), the catalyst intermediate obtained from the first stage (1.1) is converted to the actual supported catalyst in the course of three substages (1.2.1), (1.2.2) and (1.2.3). The procedure for these process steps too can be carried out readily and without difficulty by the skilled worker. The apparatuses and methods advantageously used for this purpose are the well known and conventional ones for calcining or activating Phillips supported catalysts. For the second substage (1.2.2) this means that conditions should be chosen which ensure that the ready-prepared supported catalyst contains some or all of the chromium in the hexavalent state; in this respect, there are therefore no special features in comparison with the prior art. Instead, the novel features of the second stage (1.2) relate to the upstream substage (1.2.1) and the downstream substage (1.2.3), without which it would be impossible to achieve the object according to the invention. Regarding the last-mentioned substage (1.2.3), it should be noted that it is advantageously associated with a cooling process in the stated critical time and temperature range, this being not essential but effected for economic reasons.

Regarding the composition of the novel supported catalyst (1), it may be stated that in general water should as far as possible be excluded during its preparation. This begins with the carrier (1.1.1.1), which should be dried before use, in the relevant conventional manner, under severe conditions, for example for 8 hours at 140° C. and under 20 mm Hg. The inert organic solvent (1.1.1.2) likewise to be used should contain less than 0.1% by weight of water, particularly suitable solvents being $C_5$-$C_7$-alkanes, in particular n-heptane, as well as, for example, pentanes and hexanes, including cyclohexane. The chromium compound (1.1.2.2), preferably chromium(III) acetylacetonate, like the aluminum compound (1.1.2.3), usually contains water only in insignificant amounts. Particularly suitable aluminum compounds are triisobutylaluminum, but, for example, tri-n-butyl-, tri-n-propyl-, triisopropyl- and triethylaluminum are also useful. Particularly useful phosphorus compounds (1.1.3.2), which should likewise contain no more than 1% by weight of water, are diethyl phosphite, dibutyl phosphite, diethyl phosphate, di-n-butyl phosphate and triethyl phosphate, but, for example, dimethyl phosphite, diisopropyl phosphite, diphenyl phosphite, diphenyl phosphate, trimethyl phosphate and triphenyl phosphate are also suitable.

In the novel polymerization process, it is necessary to use not only a supported catalyst (1) but also a cocatalyst (2) in the form of both a certain lithiumalkyl and a certain boronalkyl. Specific examples of lithiumalkyls which are particularly useful for this purpose are n-butyllithium, sec-butyllithium and tert-butyllithium, while noteworthy boronalkyls are triethylboron and tri-n-butylboron.

EXAMPLE

Preparation of the supported catalyst (1)

(1.1) In a first stage, a catalyst intermediate is prepared by a method in which first (1.1.1) in a first substage, a suspension is prepared from (1.1.1.1) a finely divided, porous silicate carrier which has a particle diameter of from 50 to 150 μm, a pore volume of 1.75 cm$^3$/g and a surface area of 320 m$^2$/g (dried for 8 hours at 140° C. and under 20 mm Hg) and (1.1.1.2) anhydrous n-heptane under an argon atmosphere and with thorough mixing by means of stirring, with the proviso that 400 parts by weight of the organic solvent (1.1.1.2) are employed per 100 parts by weight of the carrier (1.1.1.1), then (1.1.2) in a second substage, (1.1.2.1) in the solvent of the type defined under (1.1.1.2), (1.1.2.2) chromium(III) acetylacetonate is combined with (1.1.2.3) triisobutylaluminum with thorough mixing by means of stirring, at 40° C., with the proviso that 2 parts by weight of aluminum from (1.1.2.3) and 100 parts by weight of the solvent (1.1.2.1) are employed per part by weight of chromium from (1.1.2.2), and the entire mixture is kept at the stated temperature for 15 minutes, then (1.1.3) in a third substage, (1.1.3.1) the suspension resulting from substage (1.1.1) is combined with (1.1.3.2) first triethyl phosphate and (1.1.3.3) then the product obtained from substage (1.1.2) with thorough mixing by means of stirring, at 20°

C., with the proviso that 1 part by weight of chromium from the chromium compound (1.1.2.2) and 2 parts by weight of phosphorus from the phosphorus compound (1.1.3.2) are employed per 100 parts by weight of the carrier (1.1.1.1), and the entire mixture is kept at the stated temperature for 30 minutes and finally, (1.1.4) in a fourth substage, the suspension obtained in substage (1.1.3) is evaporated to dryness at up to 80° C. under reduced pressure (down to 20 mm Hg) in a rotary evaporator.

(1.2) In a second stage, the catalyst intermediate obtained from the first stage (1.1) is converted to the actual supported catalyst by a method in which, in each case by means of a fluidized bed, first (1.2.1) in a first substage, the catalyst intermediate obtained from the first stage (1.1) is kept in a stream of anhydrous nitrogen for 120 minutes at 200° C., then (1.2.2) in a second substage, the intermediate obtained from substage (1.2.1) is kept in a stream of anhydrous air for 120 minutes at 600° C., and finally (1.2.3) in a third substage, the intermediate obtained from substage (1.2.2) is kept in a stream of anhydrous nitrogen for 60 minutes at a temperature which decreases from 250° to 100° C.

Polymerization using the supported catalyst (1) and the cocatalyst (2)

A steel autoclave having a useful volume of 1 liter and equipped with a stirrer is heated to 95° C. and flushed with dry nitrogen for 10 minutes. Thereafter, 1 ml of a solution containing both 10 g of n-butyllithium and 15 g of triethylboron as cocatalyst (2) per 1 of n-heptane, and 500 ml of isobutane, are introduced into the reactor. By feeding in ethene, the pressure is then increased to 40 bar and 80 mg of the supported catalyst (1) are added with the aid of a valve, the atomic ratio of chromium in the supported catalyst to lithium plus boron in the cocatalyst being 1:5, after which the polymerization is maintained. After 60 minutes at a polymerization temperature of 95°±2° C., the autoclave is let down with evaporation of the isobutene and of the unconverted ethene, and the resulting polymer is removed.

The table below gives further information on the resulting product.

COMPARATIVE EXPERIMENT 1

Preparation of the supported catalyst 100 g of a carrier described in the example are suspended in 500 g of water, and an amount of $H_3PO_4$ and aluminum nitrate corresponding to 2 g of phosphorus and 2 g of aluminum, respectively, is added with thorough mixing at 20° C. After the further addition of an amount of chromium nitrate containing 1 g of chromium, the suspension is mixed thoroughly at the above temperature for a further 30 minutes and finally evaporated to dryness as described in the example.

The catalyst intermediate obtained is kept in a dry stream of air for 120 minutes at 600° C. Polymerization This is carried out in the same manner as the example, with the exceptions that (i) the supported catalyst described above is used in the same amount and (ii) no n-butyllithium is present.

The table likewise gives further information about the product obtained in this process.

COMPARATIVE EXPERIMENT 2

Preparation of the supported catalyst 100 g of the carrier described in the example are suspended in 400 g of dry dichloromethane under an argon atmosphere. A reaction product which contains 1 g of chromium and is obtained from a corresponding amount of chromium trioxide with the addition of a stoichiometric amount of triethyl phosphate with thorough mixing in 100 g of dichloromethane is added at 20° C. the components being mixed thoroughly. After the further addition of an amount of tri-sec-butylaluminum corresponding to 2 g of aluminum and thorough mixing for 30 minutes at 20° C., the resulting suspension is evaporated to dryness as described in the example.

The catalyst intermediate thus obtained is kept in a stream of dry air for 120 minutes at 600° C. Polymerization The procedure is carried out in the same manner as in the example, with the exception that (i) the supported catalyst described above is used in the same amount and (ii) no n-butyllithium is present.

The table likewise gives further information on the product obtained in this process.

COMPARATIVE EXPERIMENT 3

Preparation of the supported catalyst 100 g of the carrier described in the example are suspended in 400 g of anhydrous dichloromethane. An amount of tri-sec-butylaluminum corresponding to 2 g of aluminum is added at 20° C., with thorough mixing, and the suspension obtained is evaporated to dryness as described in the example.

The intermediate thus obtained is kept in a stream of dry air for 120 minutes at 600° C.

The product is again suspended in 400 g of dichloromethane, after which an amount of the reaction product of chromium trioxide with triethyl phosphate, which contains 1 g of chromium and is described in Comparative Experiment 2, is added at 20° C. with thorough mixing, and the mixture is once again evaporated to dryness in a rotary evaporator.

The catalyst intermediate thus obtained is kept in a stream of dry air for 120 minutes at 850° C. Polymerization The procedure is carried out in the same manner as in the example with the exceptions that (i) the supported catalyst described above is used in the same amount and (ii) no n-butyllithium is present.

The table below once again gives further information on the product obtained in the process.

TABLE

|  | Productivity[a] (g of PE/g of catalyst) | HLMI[b] (g/10 min) |
|---|---|---|
| Example | 4500 | 27.1 |
| Comparative experiment 1 | 1800 | 5.7 |
| Comparative experiment 2 | 1400 | 7.5 |
| Comparative experiment 3 | 1600 | 22.6 |

[a]g of polymer per g of supported catalyst (1).
[b]according to DIN 53,735 at 190° C./21.6 kp.

The products obtained in the comparative experiments have substantially lower productivity and a lower melt flow index than the product prepared according to the invention.

We claim:

1. In a process for the production of a supported catalyst (1) for Phillips catalysis, consisting of a carrier which is laden with chromium in oxide form, phosphorus in oxide form and aluminum in oxide form, by
(1.1) in a first stage, preparing a catalyst intermediate
(1.1) laden with the desired amounts of chromium, phosphorus and aluminum from
(1.1.a) a finely divided, porous silicate carrier,
(1.1.b) a selected, specific chromium compound,
(1.1.c) a selected, specific phosphorus compound and
(1.1.d) a selected, specific aluminum compound, and then
(1.2) in a second stage, keeping the catalyst intermediate
(1.1) obtained from the first stage in an anhydrous gas stream containing oxygen in a concentration of more than 10% by volume for from 10 to 1000 minutes at from 300° to 900° C. and thus converting it into the actual supported catalyst (1), the improvement which comprises;
(1.1) in the first stage, preparing a catalyst intermediate by a method in which first,
(1.1.1) in a first substage, a suspension is prepared from
(1.1.1.1) a finely divided, porous silicate carrier which has a particle diameter of from 1 to 400 μm, a pore volume of from 0.5 to 3 cm³/g and a surface area of from 100 to 1000 m²/g, and
(1.1.1.2) an inert organic solvent, with thorough mixing, and with the proviso that from 150 to 5000 parts by weight of the solvent (1.1.1.2) are employed per 100 parts by weight of the carrier (1.1.1.1), thereafter
(1.1.2) in a second substage,
(1.1.2.1.) in a solvent of the type defined under (1.1.1.2)
(1.1.2.2) a chromium compound of the formula

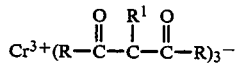

where R is alkyl of not more than 12 carbon atoms and R¹ is alkyl of not more than 12 carbon atoms, or hydrogen, is combined with
(1.1.2.3) an aluminum compound of the formula AlR₃², where R² is alkyl of not more than 12 carbon atoms, with thorough mixing, at from 0° to 100° C., with the proviso that there are from 0.5 to 10 parts by weight of aluminum from the aluminum compound (1.1.2.3) and from 5 to 500 parts by weight of solvent (1.1.2.1) per part by weight of chromium from the chromium compound (1.1.2.2), and the entire mixture is kept at the stated temperature for form 5 to 300 minutes, thereafter
(1.1.3) in a third substage,
(1.1.3.1) the suspension resulting from substage (1.1.1) is combined with
(1.1.3.2) a phosphorus compound of the formula P(O)(OR³)₃ or P(O)H(OR³)₂, where R³ is alkyl, aryl or cycloalkyl of not more than 12 carbon atoms, or hydrogen, with the proviso that one or more radicals R are not hydrogen, and
(1.1.3.3) the product obtained from substage (1.1.2), with thorough mixing at from 0° to 60° C., with the proviso that from 0.1 to 5 parts by weight of chromium from the chromium compound (1.1.2.2) and from 0.5 to 10 parts by weight of phosphorus from the phosphorus compound (1.1.3.2) are employed per 100 parts by weight of the carrier (1.1.1.1), and the entire mixture is kept at the stated temperature for from 5 to 300 minutes, and finally
(1.1.4) in a fourth substage, the suspension obtained in substage (1.1.3) is evaporated to dryness at no higher than 150° C., under atmospheric or reduced pressure, and thereafter
(1.2) in the second stage, the catalyst intermediate obtained from the first stage (1.1) is converted to the actual supported catalyst by a method in which first,
(1.2.1) in a first substage, the catalyst intermediate obtained from the first stage (1.1) is kept in a stream of anhydrous nitrogen, at from 150° to 300° C. for from 60 to 500 minutes, thereafter
(1.2.2) in a second substage, the intermediate obtained from substage (1.2.1) is kept in an anhydrous gas stream containing oxygen in a concentration of more than 10% by volume for from 10 to 1000 minutes at from 300° to 900° C., and finally
(1.2.3) in a third substage, the intermediate obtained from substage (1.2.2) is kept in a stream of anhydrous nitrogen for from 10 to 300 minutes at from 50° to 400° C.

* * * * *